United States Patent
Williams et al.

(10) Patent No.: US 7,269,596 B2
(45) Date of Patent: Sep. 11, 2007

(54) AUDIO AND/OR VIDEO GENERATION APPARATUS

(75) Inventors: Michael John Williams, Basingstoke (GB); Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 414 days.

(21) Appl. No.: 10/688,716

(22) Filed: Oct. 17, 2003

(65) Prior Publication Data
US 2004/0085342 A1    May 6, 2004

(30) Foreign Application Priority Data
Oct. 21, 2002    (GB)    ................. 0224443.2

(51) Int. Cl.
G06F 17/00    (2006.01)
G06F 7/00    (2006.01)

(52) U.S. Cl. .................. 707/102; 707/3; 707/10; 382/276

(58) Field of Classification Search ........ 707/100–102; 715/723; 382/276
See application file for complete search history.

(56) References Cited

U.S. PATENT DOCUMENTS

| | | | |
|---|---|---|---|
| 6,226,618 B1 * | 5/2001 | Downs et al. | 705/1 |
| 6,278,791 B1 * | 8/2001 | Honsinger et al. | 382/100 |
| 6,670,966 B1 * | 12/2003 | Kusanagi | 715/723 |
| 6,738,100 B2 * | 5/2004 | Hampapur et al. | 348/702 |
| 6,760,042 B2 * | 7/2004 | Zetts | 715/716 |
| 6,823,076 B2 * | 11/2004 | Cahill et al. | 382/100 |
| 7,043,048 B1 * | 5/2006 | Ellingson | 382/100 |
| 2001/0019657 A1 * | 9/2001 | McGrath et al. | 386/46 |
| 2002/0001395 A1 | 1/2002 | Davis et al. | 382/100 |

(Continued)

FOREIGN PATENT DOCUMENTS

WO    WO 01/52178    7/2001

OTHER PUBLICATIONS

"Efficient Video Similarity Measurement and Search", Sen-ching S. Cheung and Avideh Zakhor, IEEE International on Image Processing: vol. 1, 2000, p. 85-88.*

*Primary Examiner*—Chong H. Kim
*Assistant Examiner*—Susan Rayyan
(74) *Attorney, Agent, or Firm*—Oblon, Spivak, McClelland, Maier & Neustadt, P.C.

(57) ABSTRACT

An audio/video generation apparatus comprises an audio and/or video generation device operable to generate audio and/or video material, and a metadata generation processor. The metadata generation processor is operable to generate metadata describing the content and/or attributes of the audio/video material. The metadata generation processor is operable to generate a reference value providing a quasi-unique reference to the audio/video material with a reduced amount of data with respect to the audio/video material itself, the reference value being generated from data values representing the audio/video material in accordance with a predetermined relationship. The quasi-unique reference may be stored in association with the metadata describing the audio/video material from which the quasi-unique reference was generated.

Generating a quasi-unique reference from the information material provides a facility for identifying the audio/video material. In one embodiment the quasi-unique reference is a hash value. The hash value provides a quasi-unique reference, which can be efficiently searched in order to identify, the audio/video material. Accordingly, metadata, which describes the content or attributes of the audio/video material, may be uniquely or quasi uniquely associated with the information material.

21 Claims, 5 Drawing Sheets

U.S. PATENT DOCUMENTS

| | | | |
|---|---|---|---|
| 2002/0056126 A1* | 5/2002 | Srikantan et al. | 725/87 |
| 2002/0131746 A1* | 9/2002 | Bayramian et al. | 385/131 |
| 2002/0136531 A1* | 9/2002 | Harradine et al. | 386/69 |
| 2003/0021441 A1* | 1/2003 | Levy et al. | 382/100 |
| 2003/0028796 A1* | 2/2003 | Roberts et al. | 713/193 |
| 2003/0031456 A1* | 2/2003 | Vogel | 386/35 |
| 2003/0085997 A1* | 5/2003 | Takagi et al. | 348/143 |
| 2004/0001631 A1* | 1/2004 | Camara et al. | 382/224 |
| 2006/0075237 A1* | 4/2006 | Seo et al. | 713/176 |
| 2006/0117180 A1* | 6/2006 | Kalker | 713/176 |

* cited by examiner

AUDIO AND/OR VIDEO GENERATION APPARATUS

FIELD OF THE INVENTION

The present invention relates to apparatus and methods for facilitating development of audio and/or video material using metadata. Metadata is data which describes the contents and/or attributes of video and/or audio material.

BACKGROUND OF THE INVENTION

Co-pending UK patent applications 0207020.9, 0206994.6, 0206987.0 and 0206995.3 disclose a system and apparatus for generating audio and/or video (a/v) productions. The system may according to one application utilize a camera with a camera utility device and a personal digital assistant (PDA). The camera utility device and the digital assistant are provided with a wireless communications link. The camera is arranged in use to generate a/v material by capturing images and sounds which are recorded on a recording medium such as, for example, a cassette tape. The utility device generates metadata describing the content of the a/v material and/or other attributes of the a/v material such as camera parameter settings used to generate the a/v material.

The metadata may be arranged in the form of a hierarchical data structure including a volume identifier at a first level, and shot or sub-shot identifier at a second level. The volume identifier provides an indication of the data carrier on which the a/v material is stored. The shot or sub-shot identifiers provide an indication of the location of shots or sub-shots of a/v material on the data carrier. Metadata describing the content or attributes of the shots may, for example, be stored in association with the shot or sub-shot identifier in correspondence with the shot or sub-shot of a/v material to which the metadata relates.

Generally, for a system generating metadata describing the content or the attributes of a/v material, it is desirable to efficiently identify the location of the a/v material on a data carrier on which the material is stored, with respect to which the metadata has been generated.

SUMMARY OF INVENTION

An object of the present invention is to provide a facility for efficiently identifying the location of an item of a/v-material on a data carrier with respect to which metadata has been generated for the a/v-material.

According to the present invention there is provided an audio and/or video generation apparatus, comprising an audio and/or video generation device operable to generate audio and/or video material, and a metadata generation processor. The metadata generation processor is operable to generate metadata describing the content and/or attributes of the audio/video material. The metadata generation processor is operable to generate a reference value providing a quasi-unique reference to the audio/video material with a reduced amount of data than the audio/video material itself. The reference value is generated from data values representing the audio/video material in accordance with a predetermined relationship.

Generating a quasi-unique reference from the audio/video (a/v) material provides a facility for identifying the audio/video material. In one embodiment the quasi-unique reference is a hash value. The hash value provides a quasi-unique reference, which can be efficiently searched in order to identify the audio/video material or part of the audio/video material from which the reference value was generated. Accordingly, metadata, which describes the content and/or attributes of the a/v material, may be uniquely or quasi uniquely associated with the audio/video material. As such, if the metadata is stored separately from the data carrier on which the a/v material is stored, then it is not necessary to provide a reference on the data carrier itself, through which the a/v material can be associated with the metadata. This is because the quasi-unique reference value, which provides an association of the metadata with the a/v material, is generated from the a/v material itself. Accordingly, if the metadata and the a/v material are communicated and stored separately, the a/v material may be re-associated with the metadata, by regenerating the hash value from the a/v material itself. Thus, by comparing a quasi-unique reference value regenerated from the audio/video material, with an original quasi-unique reference value, which has been stored as part of the metadata then the association of the metadata with the audio/video material may be made.

The predetermined relationship through which the quasi-unique reference value is generated is according to one embodiment a predetermined selection of data values derived from pixels of video frames. The data values may be, for example, derived from luminance and/or chrominance values of selected pixels within each frame or from a collection of frames.

The term hash is used to define a reference value generated from a/v material to represent or identify the a/v material using a smaller amount of data than the a/v material itself, which is being or to be referenced. Typically, hash values are used to facilitate searching of databases such as telephone directories or other lists. The hash value typically provides a quasi-unique identification of the item of information material, which is to be searched. An example of hash coding is disclosed on page 365 of a book entitled "Structured Computer Organization" $2^{nd}$. Ed. By Andrew S. Tanenbaum, Prentice-Hall International Editions 0-13-854605-3.

According to another aspect of the present invention there is provided a metadata association processor operable to regenerate a quasi-unique reference from the audio/video material in accordance with the predetermined relationship from which an original quasi-unique reference was produced. The association processor is operable to search the metadata for a match between the original quasi-unique reference and the regenerated quasi-unique reference value, and to associate the metadata stored in association with the original quasi-unique reference with the audio/video material from which material the regenerated quasi-unique reference was produced.

According to a further aspect of the invention there is provided an ingestion processor comprising an audio/video material reproduction device operable to receive a data carrier bearing audio/video material and to reproduce the audio/video material from the data carrier, and a metadata ingestion processor. The metadata ingestion processor is operable to receive metadata describing the content of the audio/video material. The metadata includes an original quasi-unique reference value generated from the audio/video material in a accordance with a predetermined relationship with the material. The ingestion processor includes a metadata association processor operable to associate the audio/video material with the metadata using quasi-unique reference values. The metadata association processor is operable to regenerate a quasi-unique reference value from the audio/video material reproduced from the data carrier in accordance with the predetermined relationship by which the original quasi-unique reference value was generated. The association processor is operable to associate the metadata with the audio/video material, which is described by the metadata by comparing the original and the regenerated quasi-unique reference values.

In preferred embodiments the metadata is formed as a string defined by a mark-up language. The string may include an identifier of the data carrier on which the a/v material is contained and shots or sub-shot identifiers, identifying the metadata associated with particular shots or sub-shots of a/v material. Metadata describing the shots or sub-shots may include a quasi-unique reference which is generated from the a/v material and which a/v material the metadata describes.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which.

DESCRIPTION OF PREFERRED EMBODIMENTS

System Overview

Figure 1:
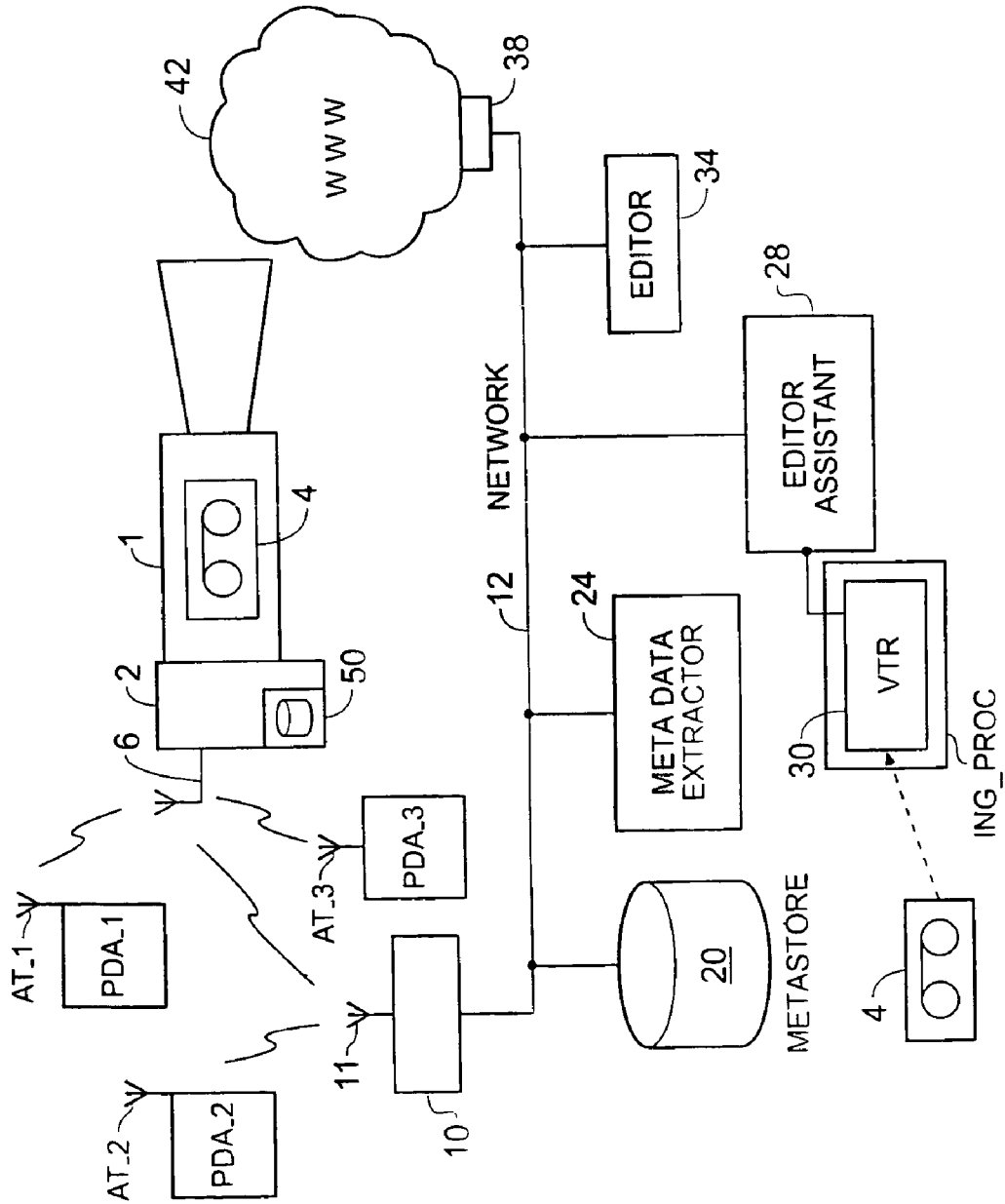
FIG. 1 is a schematic block diagram of a system for generating a/v productions.

FIG. 1 provides an example configuration illustrating embodiments of the present invention. Advantages of the embodiments will become apparent from the following explanation. As explained in our co-pending UK patent application 0207020.9, the system illustrated in FIG. 1 provides an improved facility for generating a/v productions. However, although this system will be used to illustrate one application of embodiments of the present invention, it will be appreciated that the present invention is not limited to this particular application. Accordingly, embodiments of the present invention may be utilized in other systems and other applications in which a section of a/v data is to be associated with metadata describing the contents and/or attributes of that material.

In FIG. 1, a camera 1 includes a camera utility device 2. The camera 1 in operation captures images and sounds and represents these images and sounds as a/v material which is recorded on a cassette tape 4. The cassette tape 4 provides a linear storage medium but is one example of a data carrier on which the audio/video material may be stored. Another example of a data carrier could be a non-linear storage medium such as a hard disk. However it will be appreciated that the data carrier could be any medium or signal for representing data.

The camera utility device 2 is a mountable unit, which can be removed from the camera 1. However, it will be appreciated that the camera utility device is just one example of a utility unit, which, in alternative arrangements may be integrated within the camera 1. In a general sense the camera utility device 2 is a utility device, the function of which is explained in the following paragraphs.

The camera utility device 2 attached to the camera 1 provides a facility for generating metadata. The metadata may comprise different metadata types, some of which may describe the content of the a/v material and others may describe the attributes of the camera which were used when the a/v material was generated. The camera utility device 2 also includes an antenna 6, which is coupled to a radio communications transmitter/receiver within the camera utility device 2. The radio communications transmitter/receiver (not shown in FIG. 1) provides a facility for radio communications with a wireless Ethernet communicator 10 via an antenna 11 through which Ethernet communication is provided with devices connected to a network 12.

As shown in FIG. 1, various devices 20, 24, 28, 34, 38 are connected to the network 12. The network 12 provides a facility for communicating data between the devices. Connected to the network 12 is a meta store 20, a metadata extractor 24, an editor assistant 28, which also includes a video tape recorder 30, and an editor 34. The devices may use metadata for difference purposes. Each device is an example of a metadata node or meta node. The PDAs and the camera utility device may also form meta nodes.

Also connected to the network 12 is a gateway 38 providing a facility for communicating with devices connected to the world-wide-web WWW represented as a cloud 42. Also forming part of the material development system in FIG. 1 are three personal digital assistants (PDAs), PDA_1, PDA_2 and PDA_3. Each of the PDAs includes an antenna AT1, AT2, AT3. As will be explained in the following paragraphs, each of the PDAs PDA_1, PDA_2, PDA_3 is provided with a radio communications transmitter/receiver device. The radio transmitter/receiver is arranged to provide a wireless radio communications link with either the camera utility device 2 attached to the camera 1 or the wireless Ethernet communicator 10. The wireless radio communications link may operate in accordance with a wireless standard such as IEEE 802.11.

The personal digital assistants are one example of assistant devices operable to provide a portable means for data storage and display and may include a user interface.

As will be explained in the following paragraphs, the material development system shown in FIG. 1 provides a facility for generating a/v material which is recorded onto the cassette tape 4. As explained in our co-pending UK patent application numbers 0008431.9 and 0008427.7, the camera utility device 2 generates metadata as the a/v material is produced and recorded onto the cassette tape 4. However, typically, the camera will be operated away from a studio in which facilities are provided for editing the a/v material into an a/v production. As such, when the camera 1 is operating off-site away from the studio, the camera utility device 2 is arranged to store metadata on a removable hard disk 50 which is shown to form part of the utility box 2. Furthermore, when the camera is being operated away from the studio, a wireless communications radio link is formed between the camera utility device 2 and the PDAs which are in radio communications range of the camera utility device 2. Accordingly, when in range, the camera utility device 2 can communicate metadata via the radio communications link to the PDAs PDA_1, PDA_2, PDA_3. However, when the camera utility device is in radio communications range of the Ethernet wireless link 10, then metadata can be communicated via the wireless Ethernet link to the network 12. Therefore any of the devices connected to the network 12 can have access to the metadata.

The a/v material itself, which is recorded onto the cassette tape 4, is typically transported separately and ingested by an ingestion processor ING_PROC having a Video Tape Recorder/Reproducer (VTR) 30, by loading the cassette tape 4 into the VTR 30. As will be explained shortly, the VTR may form part of an ingestion processor, which is arranged to recover the a/v material from the cassette tape 4.

Figure 2:
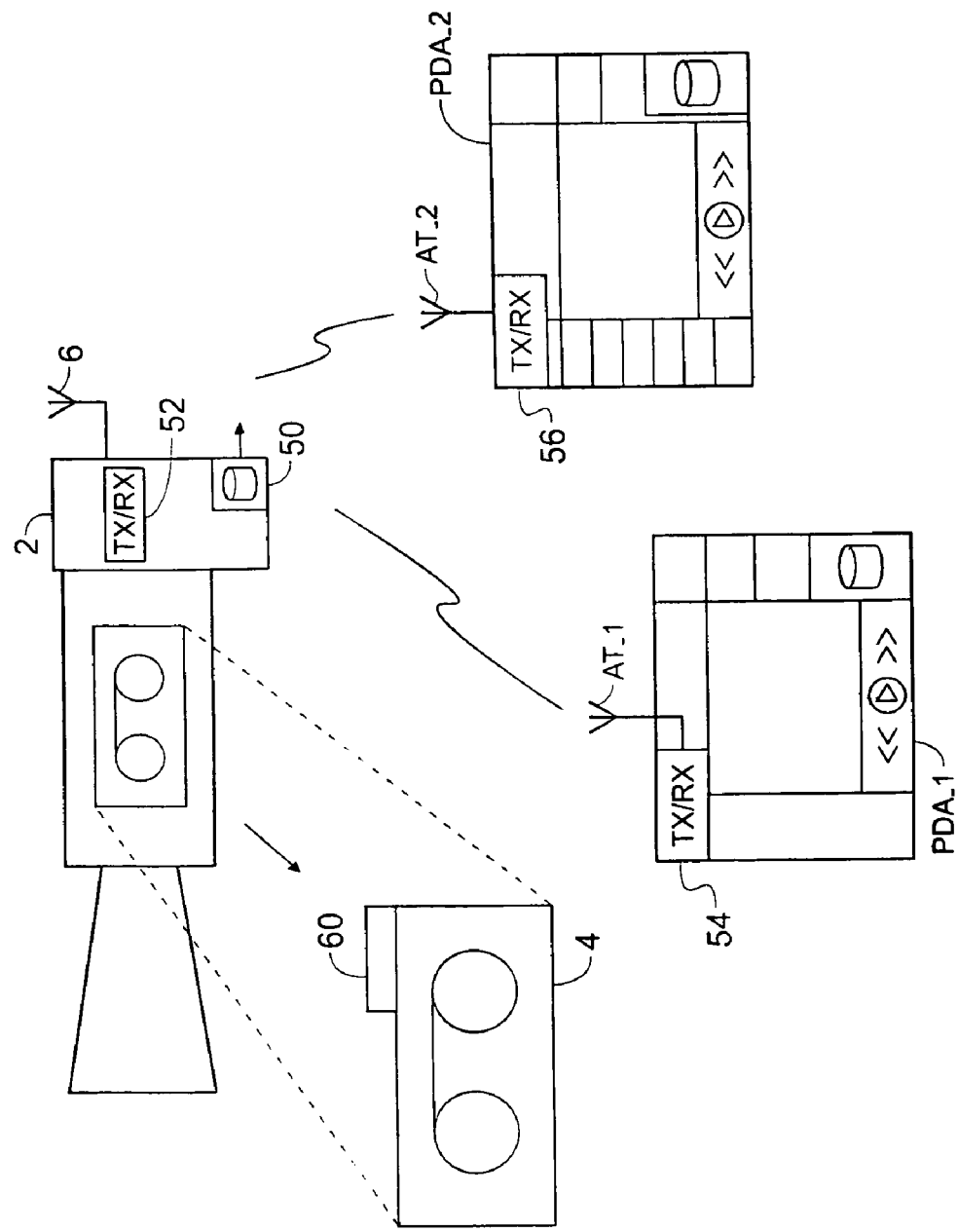
FIG. 2 is a schematic block diagram of a camera with a camera utility device and personal digital assistants shown in FIG. 1 operating remotely.

As shown in FIG. 2, the cassette tape 4 includes a data store 60 which may be, for example, an electronically readable label such as a TELE-FILE™ label providing a facility for identifying the cassette tape 4. The label is therefore one example of a volume identifier (ID), which is used to identify the a/v material or a collection of a/v material on the cassette tape 4. Typically, but not exclusively, the volume ID identifies the data carrier (cassette tape) on which the a/v material is stored.

The camera 1 with the camera utility device 2 is shown in more detail in FIG. 2 with two of the PDAs PDA_1, PDA_2. The configuration shown in FIG. 2 reflects a situation where the camera is used away from the network shown in FIG. 1. Accordingly, as explained above, the PDAs are communicating with the camera utility device 2 via the wireless communications link formed between the antennae AT_1, AT_2, 6 and the wireless transmitters and receivers 52, 54, 56.

As the camera 1 is generating the a/v material, the camera utility device 2 is arranged to generate a proxy version of the a/v material. For the example of video material, a video proxy is produced. The video proxy provides a lower quality, lower bandwidth representation of the video material. The a/v proxy is then stored on the removable hard disk 50. The proxy may also be communicated on request to any of the PDAs PDA_1, PDA_2 via the wireless communications link. Furthermore, when the camera is within radio communications range of the Ethernet wireless link 10, the a/v proxy may be communicated via the network 12 to any of the devices connected to the network 12.

The system presented in FIGS. 1 and 2 provides an improved facility for generating a/v productions. This is provided by arranging for the camera utility device to communicate metadata generated with the a/v material to either the PDAs or any device connected to the network when in range of the wireless Ethernet link. As such the camera utility device forms a meta node when in radio communications range of the network. However, because the metadata is communicated and/or stored separately from the a/v material, there is presented in some applications a technical problem in re-associating the metadata with the a/v material which the metadata describes.

Generating a Quasi-Unique Value from the A/V Material

As explained above the camera utility device is arranged to generate metadata describing the content of the a/v material. As explained in the following sections the metadata may be generated by the camera utility device in the form of a metadata string in XML format, although embodiments of the present invention are not limited to forming the metadata as an XML string.

The metadata string may also include an identification of the volume on which the a/v material is recorded. In the above example this is the TELE-FILE label although it will be appreciated that other appropriate volume IDs may be used. In addition the XML metadata string includes for each shot a UMID and optionally a URI address or shot material ID. The URI address provides an indication of a unique resource identification where other forms of metadata such as video proxy may be stored.

Figure 3:
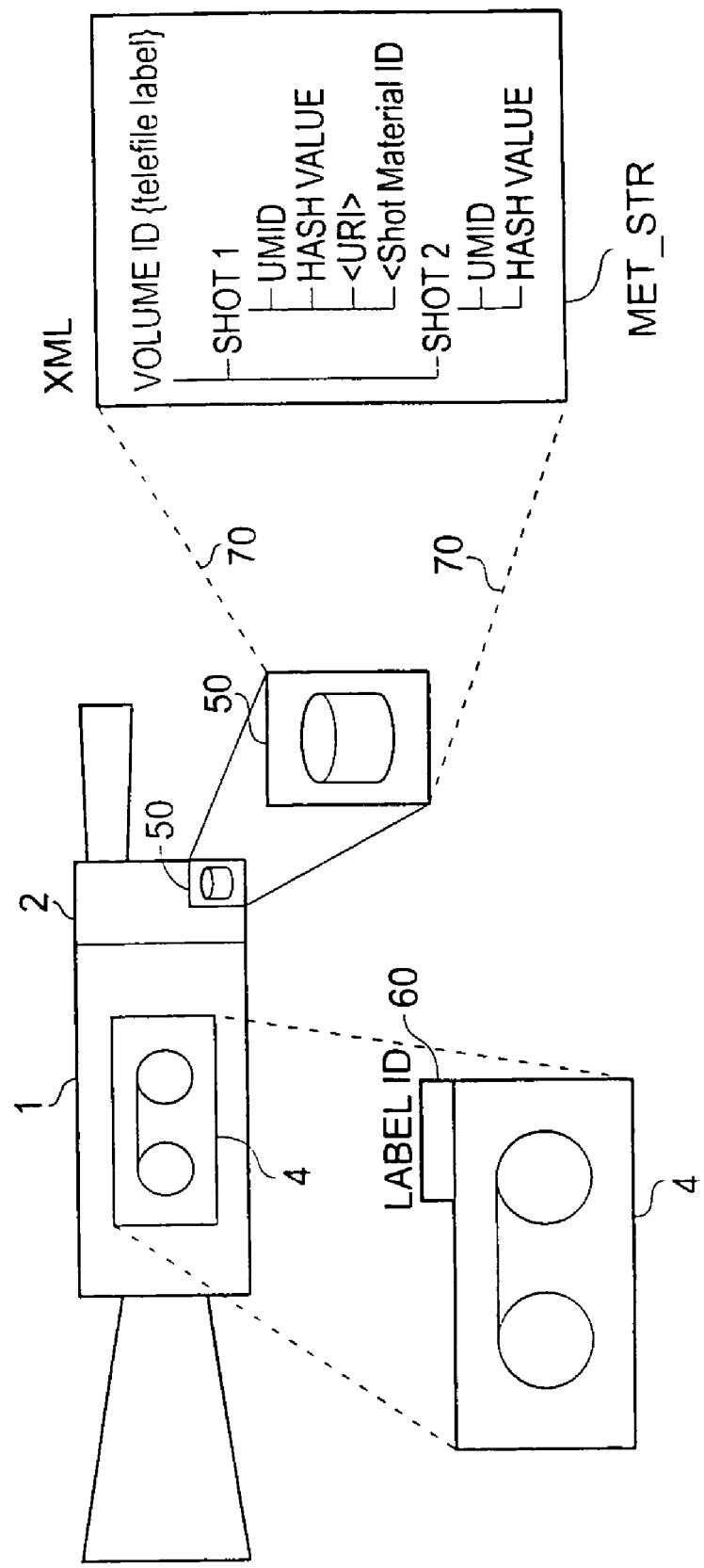
FIG. 3 is a schematic representation of a camera, which exemplifies an a/v-material generation device according to an example embodiment of the present invention.
Figure 4:
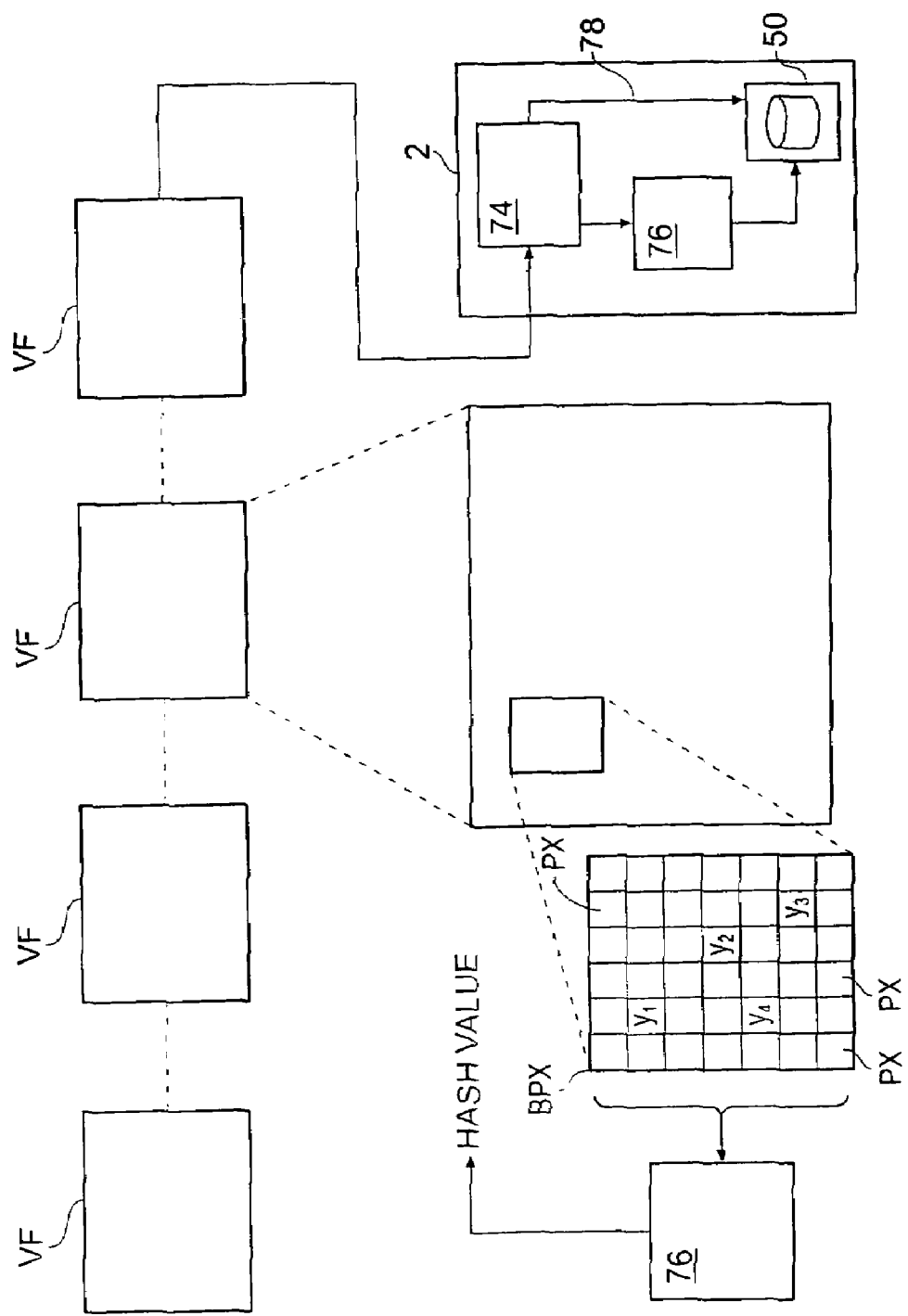
FIG. 4 is a part schematic block diagram, part flow diagram illustrating operations performed in generating a quasi-unique reference value from the a/v-material, performed by the camera utility device shown in FIG. 3.

An embodiment of the present invention will now be described with reference to FIG. 3. As shown in FIG. 3 the camera 1 and the camera utility device 2 as appearing in FIGS. 1 and 2 is shown with the video cassette tape 4 and the removable hard disc 50 represented in enlarged form to assist in explaining an embodiment of the invention. Also shown in schematic form as represented by dashed lines 70 is a representation of a metadata string in XML format. The metadata string MET_STR is shown to have a hierarchical data structure in the form of a tree or node structure. The first and highest tree node provides a volume ID indication which in this case corresponds to the TELE-FILE label which identifies the cassette tape 4 on which the a/v material is recorded. At the next hierarchical level two tree nodes are labelled "shot 1, shot 2" which correspond to shots of a/v material captured by the camera. Within each shot node metadata values are present and these include UMIDs as well as URI addresses identifying the location of further sources of metadata such as video proxy. Further explanation of the content of the metadata XML string will be provided in a following section. However, embodiments of the present invention are arranged to include a hash value within the metadata associated with each shot. As will be explained shortly the hash value is generated within the camera utility device 2 by a metadata generation processor. FIG. 4 provides an illustration of an arrangement for generating the hash value from the a/v material, within the camera utility device 2'.

FIG. 4 provides a schematic representation and part flow diagram illustrating how a hash value is generated from the a/v material. A hash value may be generated for each frame of video material or from a section of video material or indeed a section of audio material. Alternatively, a hash value may be generated for a plurality of frames, the frames of video material making up a particular shot. As shown in FIG. 4 video frames VF corresponding to a sequence of video are fed to a camera utility device 2' forming an example embodiment of the invention. The video frames VF are received within the camera utility device 2' at a metadata generation processor 74. The metadata generation processor 74 includes a hashing processor 76. The hashing processor 76 receives a copy of the video frames VF. From an output channel 78 metadata generated by the generation processor 74 is fed to the removable hard disc 50' on which the metadata is stored. The hashing processor 76 is arranged to generate hash values in association with predetermined units of a/v material, for example the units may be frames or for the present illustrative example shots. With reference to FIG. 3, it will be appreciated that the metadata generation processor 74 is generating the UMID value for a particular shot of a/v material and correspondingly the hashing processor 76 is generating a hash value in association with this shot.

As shown in FIG. 4, for each frame of video material VF a hash value is produced. As illustrated in FIG. 4, the hash value is produced by selecting luminance values of pixels PX which make up the video frame VF. As illustrated in FIG. 4, for example, from a block of pixels BPX four luminance values are selected in accordance with a predetermined pattern from the pixels of the block BPX. The luminance values are fed to the hashing processor 76, which generates from these luminance values y1, y2, y3, y4 a hash value in accordance with a predetermined algorithm.

For example the algorithm may multiply the luminance values y1, y2, y3, y4 as represented by for example 8 bit values. The algorithm may then divide this value by a predetermined normalizing value. Accordingly, a hash value is produced which provides a quasi-unique association of the a/v material with the hash value. Thus by storing the hash value in association with the metadata associated with the shot of a/v material, there is provided a quasi-unique association between the a/v-material and the metadata string which describes that a/v-material. As a result it is possible to derive an association of the metadata with the a/v-material without storing a particular reference on the a/v-material. In particular, an advantage is provided with reference to the generation of Unique Material IDentifiers (UMIDs). The UMID provides a relatively large amount of data, which may be difficult to store with the a/v material. Possible examples of ways in which UMIDs may be stored with the a/v-material would be to embed the UMID as a watermark within the a/v-material. Other examples include writing the UMID into the time code of, for example, a video-tape on which the a/v-material is stored. However, by deriving hash values from the a/v-material itself such as illustrated in FIG. 4, there is no need to store a particular UMID or other reference value within or in association with the a/v-material. This is because a characteristic of hashing algorithms is that they can be used to define a reference value from the data values of the material to which they are being or are to be referred. In particular, the hash value is typically a relatively small amount of data with respect to the relatively large data value of the material to which the hash is referring.

Ingestion Processor

Figure 5:
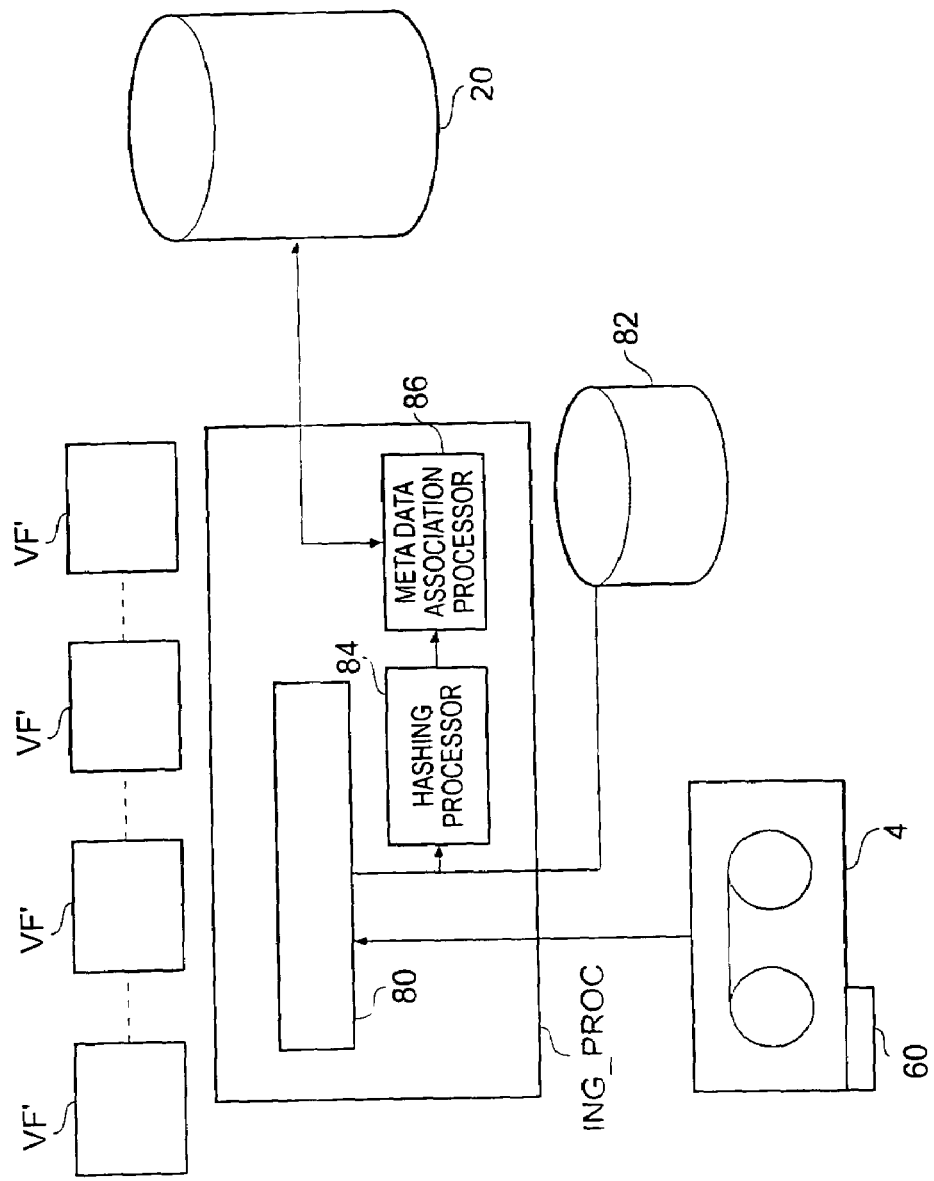
FIG. 5 is a schematic block diagram, which includes an ingestion processor according to an example embodiment of the invention.

A schematic block diagram of an ingestion processor embodying the present invention is illustrated in FIG. 5. As shown in FIG. 5 the cassette tape 4, on which a/v material has been recorded by the camera 1, is received within the VTR 30, which forms part of the ingestion processor ING_PROC. The VTR is one example of an a/v reproduction device, which is arranged to receive a data carrier, which for this example is a videocassette 4. The ingestion processor ING_PROC may also include a TELE-FILE reader, which is arranged to include the volume ID from the videocassette 4. The VTR apparatus 30 is arranged to reproduce the a/v material from the videocassette 4. As illustrated in FIG. 5 the video frames VF' have been drawn schematically with respect to the ingestion processor ING_PROC. The video frames VF are reproduced by the videocassette 4 and may optionally by stored on a hard disc 82. The video frames VF' are fed to the hashing processor 84 which is arranged to operate the same hashing algorithm as that performed by the hashing processor 76 within the camera utility device 2' shown in FIG. 4. Thus hash values are regenerated from corresponding video frames VF' reproduced by the VCR apparatus 30. The hashing processor 84 produces hash values in accordance with the same predetermined relationship with the a/v material as that followed by the hashing processor 76 within the camera utility device 2'. Since the hashing processor follows the same algorithm as the hashing processor 76 within the camera utility device 2', the hashing processor 76 should generate the same hashing values as the original values produced from the video frames VF'.

The hash values are fed to a metadata association processor 86. The metadata association processor 86 may include an Application Program Interface (API) which as explained in our co-pending UK patent application 0207015.9 provides an efficient way of communicating metadata to and from other equipment.

As shown in FIG. 5 the ingestion processor ING_PROC is connected to the metadata store 20. In the example embodiment illustrated in FIG. 4, the metadata store 20 has already ingested metadata describing the content of the a/v material, which may have been received separately from the a/v material.

Although the metadata and the a/v material may be reproduced from their respective stores, there remains the problem of relating the metadata in the metadata store 20 to the a/v material that comprises a plurality of shots and may comprise other units such as video frames VF. Accordingly, the metadata association processor 86 compares the regenerated hash values reproduced from the hashing processor 84 with the original hash values present in the shot hierarchical nodes within the metadata XML strings. By associating the original hash value within each shot with the regenerated hash values reproduced by the hashing processor, the metadata may be uniquely associated with the a/v material for which the metadata was generated and which describes the content and/or attributes of the a/v material. As such an advantage is provided by embodiments of the invention in that an identifier such as a UMID does not have to be stored with the a/v material on the same data carrier.

As will be appreciated by those skilled in the art, hashing algorithms produce a quasi-unique identification, which facilitates search of the material from which the hash value was generated. This is because the hash value is a smaller amount of data than the amount of data representing the material from which the hash value was generated. However, an inherent characteristic of such hashing algorithms is that there may be an ambiguity between the hash values produced. That is to say, for the present example embodiment, different parts of the a/v material may produce the same hash values. Therefore, in a situation where the same hash value is found in different parts of the a/v material or correspondingly the same hash value is found in different shots within the metadata, then the metadata association processor 86 is arranged to resolve this ambiguity. For example the metadata association processor is arranged to compare other metadata values from the metadata string with the a/v material in order to resolve the ambiguity.

Other Embodiments

In a further embodiment of the invention, the hash value generated within either the camera utility device 2' or the ingestion processor ING_PROC may be used to provide some information about the content of the a/v-material. In particular, by generating the hash value from the luminance values of the pixels of the video frames VF, the hash value will itself provide some information about the content of the a/v-material. For the example where the hash value is generated from the luminance values of selected pixels within the frame, the size of the hash value may provide an indication of the relative activity within the frame. Accordingly, this information may be used to provide an indication of for example a scene change.

Metadata String Structure

The following section provides a more detailed description of one example form of a metadata string, which includes a quasi-unique reference according to an embodiment of the invention. XML is one example of a mark-up language in which a metadata string can be described, other examples being HTML, WML and SMIL (Synchronized Multi-media Integrated Language). Part of the XML metadata string provides the location of the web-site for accessing the rules for the schema. This part of the string is called a 'namespace declaration'. The schema defining the correct structure of the metadata string may be declared within the XML string using the following semantics:

<Material_Description xmlns:xlink=http://www.w3.org/1999/xlink
xmlns:xsi="http://www.w3.org/2001/XMLSchema-instance"
xsi:noNamespaceSchemaLocation="D:\Temp\metanet_generated.xsd">

Two attributes which define the schema in a Material_Description node are i) a namespace declaration specifying that the 'xsi' namespace will be used ('xsi' stands for XML Schema Instance) and 2) a noNamespaceSchemaLocation attribute. This is a way of defining the location of the schema document which is used to validate the structure of the XML document. The value of this attribute indicates that the schema is located on a local hard drive "D" in a directory "Temp", and the schema is called "metanet_generated.xsd". This location could be a URI address that refers to a file on the world-wide web. However, this file could be owned, maintained and hosted by any particular organization or company.

According to the example embodiment of the present invention a requirement for identifying a/v material for which metadata has been generated requires a volume identifier (ID) and a shot identifier (ID). The volume ID defines a volume within the metadata XML string and is defined between a start volume node and an end volume node. After each volume node, the XML metadata string includes a set of metadata associated with the volume. The metadata associated with the volume may include for example metadata fields such as "reporter", "producer", "country" and "tape number", etc. Also included in the metadata volume is a material ID type which could be a Unique Material Identifier (UMID), a TELE-FILE label or a Globally or Universally Unique Identifier (UUID). Also the metadata may include a URI address of a key stamp which identifies the volume associated with a time code of the tape or another identifier.

At a next level in the XML metadata string there is provided a shot node for identifying a shot of a/v material with which metadata is associated. A shot node in the XML metadata string is defined by a shot start node and a shot end node. Within the shot node of the XML metadata string there is provided a set of metadata fields and values.

As explained above one embodiment of the present invention provides a metadata structure which includes a quasi-unique identifier generated from the a/v material itself. In one embodiment the quasi-unique value is a hash value generated in accordance with a hashing algorithm. Thus forming the hash value and including the hash value within the metadata provides an advantage in that the metadata may be associated with the a/v material without a requirement to store either the metadata or a unique or quasi-unique reference in association with the a/v material. Providing the quasi-unique reference as a hash value stored within a hierarchical data structure as a metadata item associated with a shot or sub-shot provides a facility to identify efficiently the metadata associated with a particular shot or indeed any other unit of the material such as a frame.

As will be appreciated from the representation of the XML metadata string shown below, the string includes a volume ID and a shot ID which are represented at different hierarchical levels, the shot being nested inside the volume node. Following each volume and shot node there is provided metadata associated with the volume and the shot respectively. A plurality of shot nodes may also be nested within a single volume and typically a/v material will be represented in this way for the metadata string. A simplified representation of the XML metadata string structure is shown below in which the metadata string starts with a URI for the schema for interpreting the metadata string at a root node level. A plurality of shots are arranged at a common hierarchical level which is the second hierarchical level shown below:

```
<Material Description; Schema address>
<Metadata>
    <Volume Material ID = "Vol 1">
        <Shot Material ID = "Shot 1">
            <HASH VALUE 1>
            <UMID>
            <URI>
        </Shot>
        <Shot Material ID = "Shot 2">
            <HASH VALUE 2>
        </Shot>
    </Volume>
    <Volume Material ID = "Vol 2">
        . . .
        . . .
        . . .
    </Volume>
</Material Description>
```

According to the simplified XML metadata string presented above, metadata associated with a particular shot may be accessed with an X-path string using the following query string to access "Volume 012; Shot 023":

"xpath:\\Material_Description\Volume[Volume
    [@Material_ID="Volume012"]         \Shot
    [@Material_ID="Shot 023"]"

The term node or tree node is used to reflect a tree-like data structure which provides a hierarchy of data levels.

Further Examples

The structure of the XML metadata string allows shots to be placed within shots (as kind of sub shots). For instance, take a shot of Mike and Barney:

```
<Shot Material_ID="bigshot_01">
    <Label>Interview with Mike and Barney</Label>
    <InPoint Timecode="01:00:00:00">
    <OutPoint Timecode = '01:10:00:00>
    <HASH VALUES>
</Shot>
```

A shot may have two logical sections. For example the first part of an interview is with Mike. Then, the camera still rolling turns to Barney and does an interview with him. Even though this is physically one shot, this shot could be segmented into two 'sub-shots' by either a manual or automatic process. Each of the sub-shots may have one or more hash values associated with it. For example a hash value could be generated for each frame of video. Alternatively one hash value could be generated for the entire sub-shot. This can be represented in the XML in the following way:

```
<Shot Material_ID="bigshot_01">
    <Label>Interview with Mike and Barney</Label>
    <InPoint Timecode="01:00:00:00" >
    <OutPoint Timecode = "01:10:00:00>
    <HASH VALUES>
    <Shot Material_ID="subshotofbigshot_01_01">
        <Label>Interview with Mike</Label>
        <HASH VALUES>
        <InPoint Timecode="01:00:00:00" >
        <OutPoint Timecode = "01:05:00:00>
        <HASH VALUES>
    </Shot>
    <Shot Material_ID="subshotofbigshot_01_02">
        <Label>Interview with Barney</Label>
        <InPoint Timecode="01:05:00:01" >
        <OutPoint Timecode = "01:10:00:00>
        <HASH VALUES>
    </Shot>
</Shot>
```

Furthermore, Mike's interview could be broken down again into two further sub-shots. For instance if Mike starts talking about his acting career, and then moves on to talk about his film directing, the metadata string could be represented as follows:

```
<Shot Material_ID="bigshot_01">
    <Label>Interview with Mike and Barney</Label>
    <InPoint Timecode="01:00:00:00" >
    <OutPoint Timecode = "01:10:00:00>
    <HASH VALUES>
    <Shot Material_ID="subshotofbigshot_01_01">
        <Label>Interview with Mike</Label>
        <InPoint Timecode="01:00:00:00" >
        <OutPoint Timecode = "01:05:00:00>
        <HASH VALUES>
        <Shot Material_ID="subshotofsubshotofbigshot_01_01>
        <Label>Mike the actor</Label>
        <InPoint Timecode="01:00:00:00">
        <OutPoint Timecode = "01:02:30:00>
        <HASH VALUES>
        </Shot>
        <Shot Material_ID="subshotofsubshotofbigshot_01_02>
        <Label>Mike the director</Label>
        <InPoint Timecode="01:02:30:01" >
        <OutPoint Timecode = "01:05:00:00>
        <HASH VALUES>
        </Shot>
    </Shot>
    <Shot Material_ID="subshotofbigshot_01_02">
        <Label>Interview with Barney</Label>
        <InPoint Timecode="01:05:00:01" >
        <OutPoint Timecode = "01:10:00:00>
        <HASH VALUES>
    </Shot>
</Shot>
```

Therefore any of the shots or sub-shots could be broken down into further sub-shots. The only limit would be that no sub-shot can be shorter than one frame, so this is the physical and logical limit of the nesting of shots within shots.

As will be appreciated from the foregoing description, the XML metadata string provides an encapsulated wrapper for metadata, which may be accessed using a query string. As will be appreciated by those skilled in the art, the query string defines the volume at the first hierarchy and the shot or sub-shot at the second hierarchy and possibly a particular item of, or field of, metadata which is being accessed by an API at a third hierarchy. The metadata string, alert string and query string are formed from ascii characters or Unicode.

Various modifications may be made to the embodiments hereinbefore described without departing from the scope of the present invention. In particular, it will be appreciated that any form of mark-up language could be used to describe the metadata string, XML being just one example. Furthermore, various modifications may be made to the XML metadata string without departing from the scope of the present invention. For example, other metadata examples may be introduced and the relative level of each of the volume and shot metadata types may be varied with the relative logical association of shots within volumes being maintained.

The invention claimed is:

1. An audio/video generation apparatus, comprising:
an audio/video generation device configured to generate at least one of audio and video material, and
a metadata generation processor configured to receive at least one of the generated audio and video material, and to generate metadata describing at least one of the content and attributes of the generated audio and video material,
the metadata generation processor including a hashing processor configured to generate a quasi-unique reference from at least one of the audio and video material, the quasi-unique reference being a hash value, the hash value providing a quasi-unique reference to at least one of the audio and video material with a reduced amount of data than the audio/video material itself, the hash value being generated from data values representing the at least one of audio and video material in accordance with a predetermined relationship, and the metadata generation processor configured to include the hash value as part of the metadata, said hash value and metadata being stored on a computer readable storage medium,
the metadata is represented as a data structure stored on the computer readable storage medium, said data structure describing the content of at least one shot or sub-shot of at least one of the audio and video material, the data structure comprising
a volume identification defining the computer readable storage medium on which at least one of the audio and video material is represented,
at least one shot identification defining the at least one shot or sub-shot within at least one of the audio and video material, and
the quasi-unique reference value generated from at least one the audio and video data within the shot or sub-shot.

2. An The audio/video generation apparatus as claimed in claim 1, further comprising a communications processor configured to communicate the metadata separately from at least one of said audio and video material.

3. The audio/video generation apparatus as claimed in claim 1, further comprising a second computer readable storage medium, the audio/video generation device being configured to store at least one of the audio and video material on the second computer readable storage medium.

4. An The audio/video generation apparatus as claimed in claim 1, further comprising the computer readable storage medium, the metadata generation processor being configured to store the metadata on the computer readable storage medium.

5. An The audio/video generation apparatus as claimed in claim 1, wherein the predetermined relationship provides the data values of parts of at least one of the audio and video material from which the quasi-unique reference is generated.

6. The audio/video generation apparatus as claimed in claim 5, wherein the predetermined relationship identifies pixels within a frame or a plurality of frames of the video material, the values of which pixels are used to generate the quasi-unique reference value.

7. A camera including an audio/video generation apparatus as claimed in claim 1, wherein the metadata generation processor forms at least part of a camera utility device releasably attached to the camera.

8. A computer readable storage medium storing instructions which when executed by a computer causes the computer to operate as an audio/video generation apparatus, a camera, a camera utility device or an ingestion processor according to claim 1.

9. A computer program product having a computer readable medium recorded thereon information signals representative of the computer program claimed in claim 8.

10. A metadata generation processor configured to generate metadata describing at least one of the content or attributes of audio/video material, the metadata generation processor comprising
a hash processor configured to receive at least one of audio and video material generated by an audio/video generation device, to generate a hash value from the audio/video material with a reduced amount of data than the audio/video material and to store the hash value in a computer readable storage medium, the reference value being generated from data values representing the audio/video material, the hash value being generated from data values representing at least one of video material, the data values being selected from parts of at least one of the audio and video material,
the metadata is represented as a data structure stored in the computer readable storage medium, said data structure describing the content of at least one shot or sub-shot of at least one of audio and video material, the data structure comprising
a volume identification defining a data carrier on which at least one of the audio and video material is represented,
at least one shot identification defining the at least one shot or sub-shot within at least one of the audio and video material, and
the hash value generated from at least one the audio and video data within the shot or sub-shot.

11. A metadata generation processor as claimed in claim 10, comprising the computer readable storage medium configured to store the metadata, the hash value being stored in the computer readable storage medium in association with the metadata describing at least one of the audio and video material from which the hash value was generated.

12. A camera utility device including a metadata generation processor as claimed in claim 10.

13. A metadata association processor configured to generate a hash value from at least one of audio and video material, hash value being generated in accordance with a predetermined relationship of data values from predetermined parts of at least one of the audio and video material, the predetermined relationship being the same as a predetermined relationship which was used by a metadata generation processor to generate an original hash value from corresponding parts of at least one of the audio and video material, the metadata generation processor having generated metadata describing at least one of the content or attributes of at least one of the audio and video material, the metadata association processor is configured
to search the metadata for a match between the original hash value and the generated hash value,
to associate the metadata stored in association with the original hash value with at least one of the audio and video material from which material the generated hash value was produced based on results of the search, and
to cause information pertaining to the association between the at least one of the audio and video material from the generated hash value was produced and the metadata to be stored in a computer readable storage medium.

14. An ingestion processor comprising
an audio/video material reproduction device configured to receive a data carrier bearing at least one of audio and video material and to reproduce at least one of the audio and video material from the data carrier, and
a metadata ingestion processor configured to receive metadata describing the content of at least one of the audio and video material, the metadata including an original hash value generated from at least one of the audio and video material in accordance with a predetermined relationship with the at least one audio and video material, and
a metadata association processor including a hashing processor configured to generate a hash value from at least one of the audio and video material, the hash value being generated in accordance with the predetermined relationship of data values from the predetermined parts of the at least one of the audio and video material in accordance with the parts of at least one of the audio and video material which were used to generate the original hash value, the metadata association processor is configured
to search the metadata for a match between the original hash value and the generated hash value,
to associate the metadata stored in association with the original hash value with at least one of the audio and video material from which the generated hash value was produced based on results of the search, and
to cause information pertaining to the association between the at least one of the audio and video material from the generated hash value was produced and the metadata to be stored in a computer readable storage medium.

15. The ingestion processor as claimed in claim 14, wherein the metadata association processor is configured to identify a scene change within the content of at least one of the audio and video material from the relative value of the hash values generated for each frame of the at least one of the audio and video material.

16. A method of producing at least one of audio and video material with metadata describing at least one of the content and attributes of at least one of the audio and video material, the method comprising
generating at least one of the audio and video material,
generating metadata describing at least one of the audio and video material, including generating a hash value providing a quasi-unique reference to at least one of the audio and video material with a reduced amount of data than at least one of the audio and video material, the hash value being generated from data values representing predetermined parts of at least one of the audio and video material in accordance with a predetermined relationship,
storing, in a computer readable storage medium, the hash value as part of the metadata describing at least one of the audio and video material from which audio and video material the hash value was generated, and
storing, in the computer readable storage medium the metadata as a data structure, said data structure describing the content of at least one shot or sub-shot of at least one of audio and video material, the step of storing the metadata as a data structure comprising storing a volume identification defining a data carrier on which at least one of the audio and video material is represented, storing at least one shot identification defining the at least one shot or sub-shot within at least one of the audio and video material, and storing the hash medium generated from at least one the audio and video data within the shot or sub-shot.

17. A method as claimed in claim 16, comprising communicating the metadata separately from the audio/video material.

18. A method as claimed in claim 16, comprising storing the audio/video material on a first data carrier and storing the metadata on a second data carrier.

19. A computer readable storage medium storing instructions which when executed by a computer causes the computer to perform the method according to claim 16.

20. A computer program product having a computer readable medium recorded thereon information signals representative of the computer program claimed in claim 19.

21. A method of associating at least one of audio and video material with metadata describing at least one of the content and attributes of at least one of the audio and video material, the method comprising;

generating a hash value from at least one of the audio and video material, the hash value being generated in accordance with a predetermined relationship of data values from predetermined parts of at least one of the audio and video material, the predetermined relationship being the same as a predetermined relationship used to generate an original hash value from corresponding parts of at least one of the audio and video, the original hash value being generated with the metadata describing at least one of the content and attributes of at least one of the audio and video material, searching the metadata for a match between the original hash value and the generated hash value, associating the metadata stored in association with the original hash value with the at least one of the audio and video material from which the generated hash value was produced based on the results of the searching step, and storing, in a computer readable storage medium, information pertaining to the association between the at least one of the audio and video material from the generated hash value was produced and the metadata.

* * * * *